J. WING.
Molds for Glass Lamp-Fountains.
No. 143,864.  Patented Oct. 21, 1873.
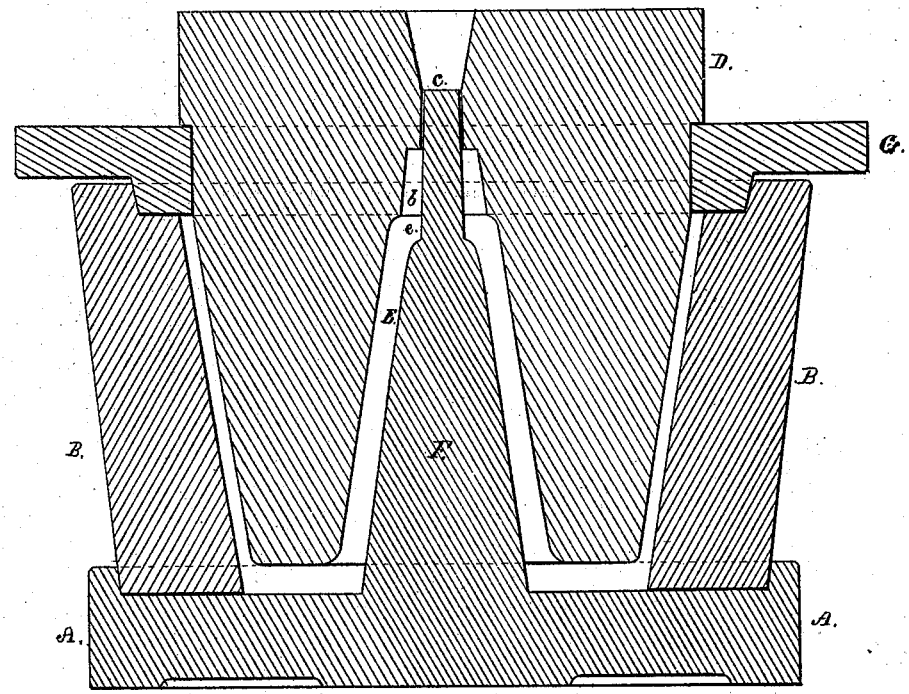
Witnesses.
Geo Gray
F. C. Hale.
Joseph Wing.
by his attorney
F. P. Hale.

UNITED STATES PATENT OFFICE.

JOSEPH WING, OF BOSTON, ASSIGNOR TO NEW ENGLAND GLASS COMPANY, OF EAST CAMBRIDGE, MASSACHUSETTS.

IMPROVEMENT IN MOLDS FOR GLASS LAMP-FOUNTAINS.

Specification forming part of Letters Patent No. 143,864, dated October 21, 1873; application filed August 6, 1873.

*To all whom it may concern:*

Be it known that I, JOSEPH WING, of Boston, in the county of Suffolk and State of Massachusetts, have invented a new and useful Improvement in Molds for Forming Argand-Lamp Fountains, of which the following is a specification, the accompanying drawing denoting a central and vertical section of a mold embodying my improvement.

My invention has special reference to the formation of the central air-duct, or draft-tube, of what are termed Argand glass fountains for lamps; and consists in a novel construction of the mold, as hereinafter described and claimed, whereby the tube is formed complete when the body of the fountain is molded.

Heretofore glass lamp-fountains of this character have invariably been formed with the upper end of the draft-tube closed, it having been considered impossible to form the tube in a completed state by means of a mold. This method, as is well known, is attended with much labor and expense in grinding and filing off the closed end of the tube after it has been molded, and much loss has occurred by the breakage of the glass while being thus manipulated. My improvement not only dispenses with all the labor of grinding and fitting, but avoids any loss by breakage of the glass.

In the drawing, A denotes the base of the mold; B, the portion for giving the external shape to the body or sides of the fountain. The chamber to mold the part to form the dome or top of the fountain is not shown, as such forms no part of my invention. I would remark that all the aforesaid parts are to be of the usual form and construction. D is a core or male die, which is formed with a shoulder to rest upon the annular part C, and extends down to a short distance of the base A, and serves to give the desired shape and thickness to the body and top-forming portions when molded. Within the part D is a conoidal chamber, E, surmounted by a small cylindrical or frusto-conic chamber, $b$, such constituting the matrix to form the exterior of the internal air-duct, the chamber $b$ giving form to the portion to receive the air-tube of the burner. From the chamber $b$ a circular passage, $c$, extends up through the part D and opens into the atmosphere. F is a core or former, which extends up from the base A, and is surmounted by a cylindrical spindle or auxiliary core, $e$, the same having a diameter approximating that of the circular passage $c$, such core giving form to the inner surface of the internal air-duct. By thus forming the chamber $b$ with an air-vent or opening, $c$, and the core F with a cylindrical or tapering extension, $e$, to extend up into the said chamber and vent-passage, the molten glass, when poured into the mold and the core D is pressed downward, is caused to rush up into and fill the chamber $b$, and form a flat surface on the upper end of the molded central air-duct, the projection of the cylindrical extension through the chamber and into the vent-passage insuring to the tube a hollow form—such tube, when the mold is removed, being perfect and ready to receive the metallic draft-tube of the burner.

Having described my invention, I claim—

In a mold for forming glass Argand-lamp fountains, constructed substantially as described, the core F, the spindle or auxiliary core $e$, and the male die or presser D, constructed, combined, and operating together in manner and for the purpose set forth.

JOSEPH WING.

Witnesses:
 H. P. HALE,
 F. C. HALE.